US012704430B2

(12) United States Patent
Ranta et al.

(10) Patent No.: US 12,704,430 B2
(45) Date of Patent: Aug. 11, 2026

(54) CALIBRATION OF FORCE SENSITIVE SENSOR DEVICE DURING ITS LIFE CYCLE

(71) Applicant: Emfit Ltd., Vaajakoski (FI)

(72) Inventors: Jukka Ranta, Vaajakoski (FI); Mikko Alasaukko-Oja, Vaajakoski (FI); Jouni Mitjonen, Vaajakoski (FI); Heikki Räisänen, Vaajakoski (FI)

(73) Assignee: EMFIT LTD., Vaajakoski (FI)

( * ) Notice: Subject to any disclaimer, the term of this patent is extended or adjusted under 35 U.S.C. 154(b) by 268 days.

(21) Appl. No.: 18/669,427

(22) Filed: May 20, 2024

(65) Prior Publication Data

US 2025/0093223 A1 Mar. 20, 2025

Related U.S. Application Data

(60) Provisional application No. 63/467,587, filed on May 18, 2023.

(51) Int. Cl.
*G01L 25/00* (2006.01)
*G01L 27/00* (2006.01)

(52) U.S. Cl.
CPC .............. *G01L 25/00* (2013.01); *G01L 27/00* (2013.01)

(58) Field of Classification Search
CPC ....... G01L 25/00; G01L 25/003; G01L 27/00; G01L 27/007
See application file for complete search history.

(56) References Cited

U.S. PATENT DOCUMENTS 3,831,588 A * 8/1974 Rindner ................ G01L 27/005 604/118
5,321,638 A * 6/1994 Witney ................... G01P 21/00 73/1.88
5,955,014 A 9/1999 Raukola
(Continued)

FOREIGN PATENT DOCUMENTS

CN 108318179 A * 7/2018 ........... G01L 27/005
DE 102013008154 A1 * 11/2014 ........... G01L 5/0061
WO 9606718 A1 3/1996

OTHER PUBLICATIONS

International Search Report in related International Application No. PCT/US2024/030275 prepared by the USPTO and having a mailing date of Aug. 27, 2024.

(Continued)

*Primary Examiner* — Herbert K Roberts
(74) *Attorney, Agent, or Firm* — Hassan Abbas Shakir; Shakir Law PLLC

(57) ABSTRACT

A system for calibrating a dynamic force sensor during a life cycle of the dynamic force sensor includes a device for sensing data using the dynamic force sensor; a first calibration system, the device including the dynamic force sensor, a computing unit, and a memory associated with the computing unit; the first calibration system includes a reference sensor and a force inducer, the force inducer for applying a force to the dynamic force sensor and the reference sensor, the force being the same on the dynamic force sensor and the reference sensor, the first calibration system executing data acquisition of the force to determine a difference in a measurement by the dynamic force sensor and a measurement by the reference sensor, wherein the first calibration system calibrates the dynamic force sensor. A method is also disclosed.

12 Claims, 4 Drawing Sheets

(56) References Cited

U.S. PATENT DOCUMENTS

| | | | | |
|---|---|---|---|---|
| 7,413,547 | B1 * | 8/2008 | Lichtscheidl | A61B 5/0215 600/485 |
| 9,804,050 | B2 * | 10/2017 | Landmann | G01K 15/005 |
| 2014/0144205 | A1 * | 5/2014 | Schmidt | G01L 25/00 73/1.08 |
| 2015/0096348 | A1 * | 4/2015 | Schulz | G01L 25/00 73/1.08 |
| 2016/0011068 | A1 * | 1/2016 | Commo | G01M 9/062 73/1.15 |
| 2016/0270678 | A1 * | 9/2016 | Swoboda | A61B 5/031 |
| 2022/0099510 | A1 | 3/2022 | Hosseinabadi et al. | |
| 2022/0211929 | A1 * | 7/2022 | Ahmed | A61M 1/3639 |
| 2024/0361198 | A1 * | 10/2024 | Lavayssiere | G01L 25/00 |

OTHER PUBLICATIONS

Written Opinion in related International Application No. PCT/US2024/030275 prepared by the USPTO and having a mailing date of Aug. 27, 2024.

* cited by examiner

542
Measuring the output of one or more dynamic force sensors 121 using data acquisition software 144a 544
Feeding a measured individual sensitivity value (pC/N) to memory 123 by computing device 143 as a calibration value 202 for dynamic force sensor 121

546
Applying calibration value 202 by gain adjuster software 125 to adjust digital gains, signal multipliers or similar components of a signal processing pipeline 203, to that, the signal is accommodated to variability in dynamic force sensor 121

FIG. 2

CALIBRATION OF FORCE SENSITIVE SENSOR DEVICE DURING ITS LIFE CYCLE

CROSS-REFERENCE TO RELATED APPLICATIONS

This application claims priority to U.S. Ser. No. 63/467,587, which is pending and which was filed May 18, 2023 and which is hereby incorporated by reference in its entirety for all purposes.

FIELD OF THE INVENTION

The invention is directed to a system for calibrating one or more sensors and a method of calibrating one or more sensors. More particularly, the invention is a directed to a system for calibrating one or more dynamic force sensors and a method of calibrating one or more dynamic force sensors. Even more particularly, the invention is a directed to a system for calibrating one or more dynamic force sensors and a method of calibrating one or more dynamic force sensors when the one or more sensors are first placed in service and continuously and dynamically as the one or more sensors are in service.

BACKGROUND OF THE INVENTION

A dynamic force sensitive sensor (herein a "dynamic force sensor") that is based on piezo ceramic PZT, polyvinyl difluoride PVDF, or cellular charged ferroelectret such as EMFIT (trademark) type, produces a charge output, often converted into voltage, on a moment when a force (weight) is applied onto the dynamic force sensor.

Alternatively, a charge output is produced when a dynamic force sensor is put on, in, or between two objects of which one or both are vibrating.

Applications for dynamic force sensors vary from vibration sensor devices such as (i) a machine for monitoring a patient, sensing a patient presence, and/or determining vital signs in a bed or on a chair of a patient, (ii) listening sounds in water (hydrophone), (iii) sensing ground vibrations (geophone), or (iv) transforming vibrations into sound (contact microphone).

Dynamic sensors, i.e. dynamic force sensors, experience high levels of measured variability in their signal output caused by a variety of sources. The causes of variability can be divided into the following categories: (i) variability arising from used materials, manufacturing process, environmental conditions during one or more of these process steps, (ii) the sensor material's aging during its use, and (iii) use case specific changes on the measured phenomenon and use case environment, e.g., with bed sensors, the change of the subject or bed.

Miniscule inconsistencies in sensor material properties or analog circuit components affect the signal levels. These effects are fairly constant over time and can be compensated for with a manufacturing-related calibration method.

Furthermore, challenges arise during sensor device's use case, e.g., when the sensor is used for tracking people's vitals or occupancy in bed or on chair. Here variability caused by the environment and changing patient-to-patient characteristics cannot be compensated for with manufacturing-related calibration. In this use case, the common sources for signal output variability are sensor location relative to the body, the cushioning below the sensor and between the sensor and a patient, bed's/chair's material characteristics, the patient's physical and physiological characteristics such as weight and existence of noise sources in the environment (e.g., air vibrations caused by air-conditioners.)

To compensate for variability, it is necessary to dynamically track signal levels and calibrate the dynamic force sensor when significant changes are detected.

Without compensating for these factors using calibration, this signal level variation would cause problems when tracking the phenomenon of interest. For example, when a bed sensor is used, a lighter patient (low weight) and sensor's location under a thick mattress would lead to a low signal output and bed occupancy would not be sensed from user's heartbeat caused vibrations. Alternatively, a high noise environment caused by air movement in the room or building vibrations could trigger the detection false bed occupancy.

SUMMARY OF THE INVENTION

This and other objectives are met by the present invention.

A system for calibrating a dynamic force sensor during a life cycle of the dynamic force sensor includes a device for sensing data using the dynamic force sensor; a first calibration system, the device comprising the dynamic force sensor, a computing unit, and a memory associated with the computing unit; the first calibration system includes a reference sensor and a force inducer, the force inducer for applying a force to the dynamic force sensor and the reference sensor, the force being the same on the dynamic force sensor and the reference sensor, the first calibration system executing data acquisition of the force to determine a difference in a measurement by the dynamic force sensor and a measurement by the reference sensor, wherein the first calibration system calibrates the dynamic force sensor. A method is also disclosed.

A method of calibrating a dynamic force sensor during a life cycle of the dynamic force sensor using a calibration system, the system comprising: a device for sensing a plurality of data using the dynamic force sensor; a first calibration system; the device comprising the dynamic force sensor, a computing unit, and a memory associated with the computing unit; the first calibration system comprising a reference sensor and a force inducer, the force inducer for applying a force to the dynamic force sensor and the reference sensor, the force being the same on the dynamic force sensor and the reference sensor, the first calibration system executing data acquisition of the force to determine a difference in a measurement by the dynamic force sensor and a measurement by the reference sensor, wherein the first calibration system calibrates the dynamic force sensor.

The method comprises the steps of applying a force to the dynamic force sensor and the reference sensor, the force being the same on the dynamic force sensor and the reference sensor, and measuring the output of the dynamic force sensors using data acquisition software.

BRIEF DESCRIPTION OF THE DRAWINGS

The invention is described in more detail by the aid of examples by referring to the below drawing figures. Therein, the drawing figures are generally chosen for convenience and clarity of presentation. The drawing figures are:

FIG. 2 is a schematic diagram of a manufacturing-related calibration method for calibrating one or more dynamic force sensors in accordance with one or more embodiments of the present invention.

DETAILED DESCRIPTION OF THE INVENTION

Figure 1:
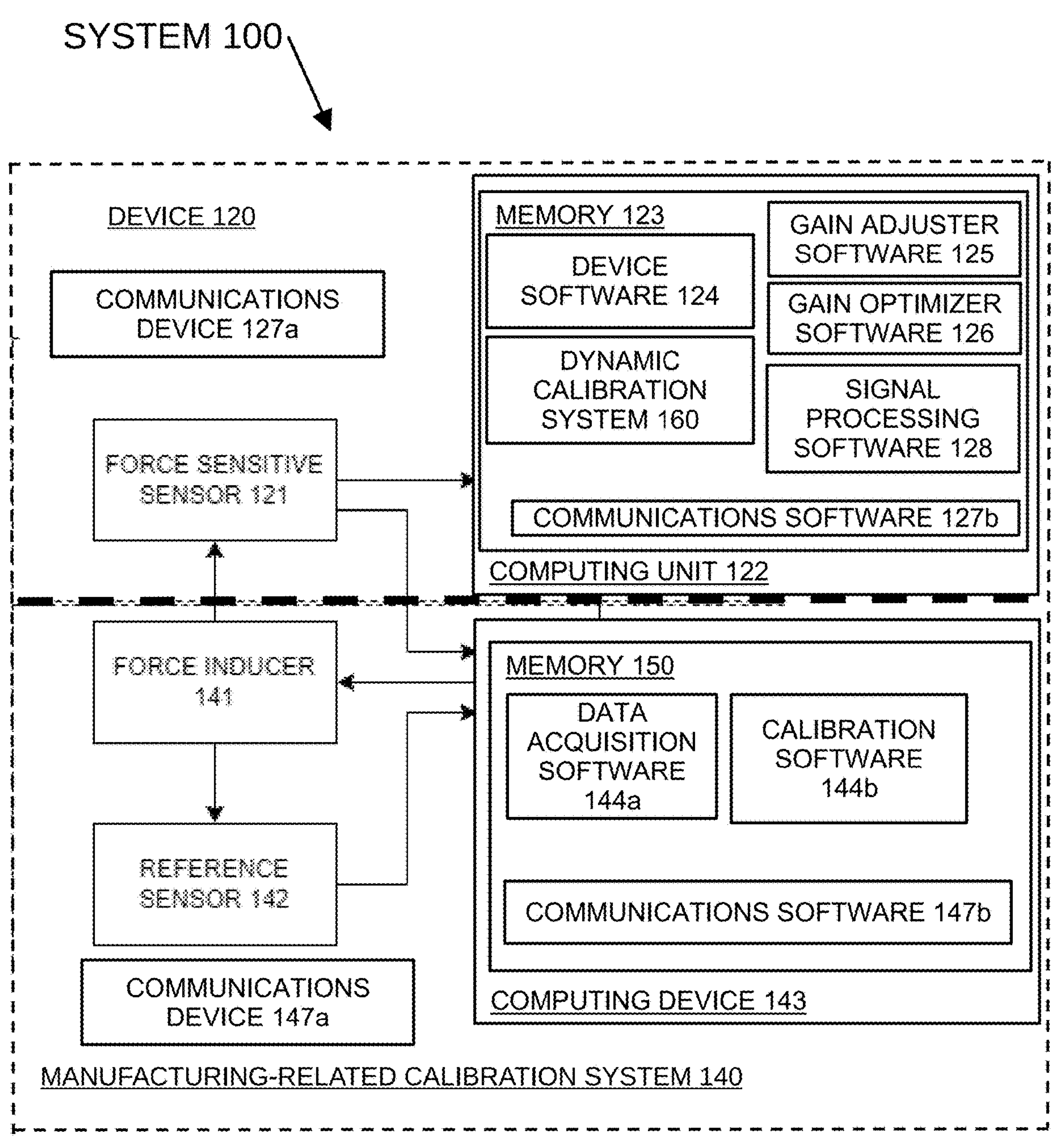
FIG. 1 is a schematic diagram of the system for calibrating one or more dynamic force sensors in accordance with one or more embodiments of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

All technical and scientific terms shall have the same meaning as commonly understood by one of ordinary skill in the art. Nonetheless, certain terms are defined herein to aid in the understanding of the disclosure; these definitions apply to all parts of speech of the term regardless of whether the term is defined explicitly as such.

Definitions

All definitions are given in the singular but are similarly applicable in the plural.

"Computing device," or interchangeably "hardware," is intended in this disclosure for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein. A computing device may have an onboard power source, access power from a rechargeable battery or wall adapter.

A computing device is usable by one or more users, other computing devices directly and/or indirectly, actively and/or passively for one or more suitable functions herein. The computing device may be embodied as a computer, a laptop, a tablet computer, a smartphone, camera, imaging device, and/or any other suitable device and may be a networked computing device, a server, or the like.

Where beneficial, a computing device preferably includes one or more human input devices such as a touch screen, a computer mouse and/or a keyboard and one or more human interaction device such as one or more monitors. A computing device may refer to any input, output, and/or calculating device associated with providing an experience of understanding the data used, collected, or analyzed by the computing device to one or more users.

Although one computing device may be shown and/or described, multiple computing devices may be used. Conversely, where multiple computing devices are shown and/or described, a single computing device may be used.

"Computer program," or interchangeably "software," means any set of instructions stored in a non-transitory computer-readable memory or non-transitory computer-readable media for executing one or more suitable functions and/or for executing one or more methods in this disclosure.

Even if not explicitly mentioned in this disclosure, a computing device includes software having any set of instructions stored in non-transitory computer-readable memory or non-transitory computer-readable media for executing one or more suitable functions and/or for executing one or more methods in this disclosure.

"Non-transitory computer-readable memory," or interchangeably "non-transitory computer-readable media," may be a hard drive, solid-state drive, compact disk drive, DVD drive, and/or the like for storing one or more computer programs.

"Sensor" means the devices defined herein, but may also mean, to the extent usable with the present invention, a transducer used for converting one or more mechanical movements to electrical analog signals corresponding to the mechanical movements and encompasses all types of transducers.

A dynamic force sensitive sensor or "dynamic force sensor" is defined in the background of the invention and defines a specific type of sensor.

"Device" means a thing or unit that carries out a meaningful function, herein a function that utilizes a dynamic force sensor. The term "device:" shall beyond its common meaning also mean an item that protects one or more other units, such a sensor, retained within a housing comprising one or more parts, one or more ports to access the unit retained within the housing, and one or more buttons to control the sensor or dynamic force sensor.

"Electret," or in accordance with one or more embodiments of the presently claimed invention "ferroelectret," refers to a dielectric material that has an essentially permanent electrical polarization. "Ferroelectret" is sometimes spelled "ferroelectret," and such spelling should be considered reasonably similar for the purposes of this invention. Ferroelectret refers to an electret having a metallic element within the "electret."

The terms "dielectric swelled cellular electret film" or "pressure inflated pre-foamed cellular electret film" are employed herein to denote a foamed plastic product, as described in WO publication 96/06718 or its equivalent U.S. Pat. No. 5,955,014 A, which is permanently charged under a strong electric field, achieved through the injection of electric charge into the material. U.S. Pat. No. 5,955,014 A is hereby incorporated by reference in its entirety for all purposes.

In contrast, the term "dielectric cellular electret film" is employed herein to denote electromechanical films of a generally cellular nature possessing a permanent electric charge without foaming.

A person seeking insight into their own or another person's health data and/or health conditions or patterns of health data or patterns of health conditions is, interchangeably, "a user," "a subject," and/or "a patient" with respect to the present invention.

"Tracking" is used as a term of art and is used in this manner in the present invention to mean acquiring quantitative health data of the subject and/or determining health data of the subject.

System for Calibrating One or More Dynamic Force Sensors

FIG. 1 is a block diagram of the system for calibrating one or more dynamic force sensors during its life cycle in accordance with one or more embodiments of the present invention.

A system 100 is used by one or more methods 500 for calibrating one or more dynamic force sensors 121 disposed in a device 120 during the life cycle of the dynamic force sensor 121.

In accordance with one or more embodiments of the present invention, system 100 comprises a device 120 comprising at least one dynamic force sensor 121, a manufacturing-related calibration system 140, and dynamic calibration system 160.

Device 120 utilizes dynamic force sensor 121 in meaningful way. In accordance with one or more embodiments of the present invention, a device 120 is a physical device that incorporates a housing and the dynamic force sensor 121 such as the hydrophone, geophone, patient monitoring devices discussed above.

A device 120 may be a virtual device wherein a dynamic force sensor 121 is disposed in, on, or near a measuring location and the measuring data (i.e. sensed data) is utilized by a computing unit to interpret, analyze, or acquire such data.

In accordance with one or more embodiments of the present invention, device 120 is defined as a device comprising a dynamic force sensor 121 and computing unit 122, wherein sensing data obtained from dynamic force sensor 121 is interpreted, analyzed, and/or acquired computing unit 122 for meaningful purposes.

Dynamic force sensor 121 is preferably disposed in, on, atop, and/or aside device 120. Device 120 further comprises a computing unit 122 for executing one or more functions of device 120 and/or functions associated with one or more methods 500. Computing unit 122 is preferably disposed in, on, atop, and/or aside device 120.

Computing unit 122 comprises a non-transitory memory 123. Memory 123 may be any suitable non-transitory memory and may include SD memory cards as known in the art. Therein, computing unit 122 further comprises one or more SD card readers. In the alternative, memory 123 comprises a plurality of non-transitory memory units or devices as now known or yet to be developed.

Device 120 comprises device software 124, also known as firmware, gain adjuster software 125, gain optimization software 126, and signal processing software 128. Device software 124 executes a plurality steps as may be necessary for the functioning of device 120. Gain optimization software 126 and signal processing software 128 are associated with dynamic calibration system 160.

Device software 124, gain adjuster software 125, gain optimization software 126, and signal processing software 128 are preferably stored in memory 123 or any alternatives described or contemplated by one skilled in the art.

Device 120 further comprises a communications device 127*a* and a communications software 127*b* stored preferably in memory 123 or any alternatives described or contemplated by one skilled in the art. Communications device 127*a* and communications software 127*b* are for communicating with a manufacturing-related calibration system 140 or preferably with communications device 147*a*.

Communications software 127*b* may be disposed or be part communications device 127*a*. That is, communications device 127*a* comprises communications software 127*b*.

Communications device 127*a* and communications software 127*b* may be a BLUETOOTH™ device and software or any other near field communications device and/or software and/or any alternatives described or contemplated by one skilled in the art. In accordance with one or more embodiments of the present invention, UART, SPI or I2C, or wireless, FM or Wi-Fi may be used.

Manufacturing-related calibration system 140 is associated with manufacturing-related calibration method 540 and comprises a force inducer 141, a reference sensor 142, and a computing device 143 for executing one or more functions of manufacturing-related calibration system 140 and/or functions associated with one or more manufacturing-related calibration method 540 and/or dynamic calibration method 560.

Manufacturing-related calibration system 140 that comprises a force inducer 141, reference sensor 142, and computing device 143 comprising a non-transitory memory 150, and a plurality of software running in computing device 143. The plurality of software comprising data acquisition software 144*a*, calibration software 144*b*.

Memory 150 may be any suitable non-transitory memory and may include SD memory cards as known in the art. Therein, computing device 143 further comprises one or more SD card readers. In the alternative, memory 150 comprises a plurality of non-transitory memory units or devices as now known or yet to be developed.

Manufacturing-related calibration system 140 comprises a data acquisition software 144*a* that is preferably stored in memory 150 or any alternatives described or contemplated by one skilled in the art.

Manufacturing-related calibration system 140 further comprises a communications device 147*a* and a communications software 147*b* stored preferably in memory 150 or any alternatives described or contemplated by one skilled in the art. Communications device 147*a* and communications software 147*b* are for communicating with device 120 or more preferably with communications device 127*a*.

Communications software 147*b* may be disposed or be part communications device 147*a*. That is, communications device 147*a* comprises communications software 147*b*.

Communications device 147*a* and communications software 147*b* may be a BLUETOOTH™ device and software or any other near field communications device and/or software and/or any alternatives described or contemplated by one skilled in the art. In accordance with one or more embodiments of the present invention, UART, SPI or I2C, or wireless, FM or Wi-Fi may be used.

In accordance with one or more embodiments of the present invention, system 100 comprises a device 120 consists of a dynamic force sensor 121 to be calibrated and manufacturing-related calibration system 140 consisting of a force inducer 141, a reference sensor 142, and a computing device 143 associated with manufacturing-related calibration method 540.

In accordance with one or more embodiments of the present invention, system 100 comprises a device 120 comprising a dynamic force sensor 121 to be calibrated and consists of a manufacturing-related calibration system 140 consisting of a force inducer 141, a reference sensor 142, and a computing device 143 associated with manufacturing-related calibration method 540.

In accordance with one or more embodiments of the present invention, a dynamic calibration system 160 is embodied as software stored in memory 123 of computing unit 122.

In accordance with one or more embodiments of the present invention, device 120 comprises a microcontroller.

Therein, a dynamic calibration system 160 is embodied as software stored in the memory of the microcontroller.

Methods of Calibration One or More Dynamic Force Sensors

In accordance with one or more embodiments of the present invention, two (2) independent methods for calibration are preferably used in conjunction with each other: a manufacturing-related calibration method 540 and a dynamic calibration method 560.

Manufacturing-related calibration method 540 corrects in whole or in part one or more signal variability originating from dynamic force sensor 121 due to the specific materials of which dynamic force sensor 121 is made, the manufacturing process that are used to make dynamic force sensor 121, and/or environmental conditions present during manufacture of dynamic force sensor 121.

Manufacturing-related calibration method 540 is, in fact, only applied once to dynamic force sensor 121 at the start of device's life cycle when the device 120 is manufactured and assembled in the production line.

Although manufacturing-related calibration method 540 maybe used more than once, manufacturing-related calibration method 540 is, preferably, only applied once to dynamic force sensor 121 and therein preferably at the start of device's life cycle when device 120 is manufactured and assembled in the production line. That is, in accordance with one or more embodiments of the present invention manufacturing-related calibration method 540 is performed during quality assurance testing of device 120.

In accordance with one or more embodiments of the present invention, manufacturing-related calibration method 540 is used when a dynamic force sensor 121 is replaced in device 120 for regular maintenance, repurposing of device 120 (for example, requiring a new dynamic force sensor 121 having a greater range), or physical damage of device 120 requiring replacement of dynamic force sensor 121.

In accordance with one or more embodiments of the present invention, a dynamic calibration method 560 may be used with a manufacturing-related calibration method different, similar in whole or in part, or identical to manufacturing-related calibration method 540 and performed by any user and not necessarily by a factory and/or its agents and/or affiliates.

Dynamic calibration method 560 is used when the device 120 is deployed to its use case environment and this can be accomplished independently of additional manufacturing-related calibration system 140.

The dynamic calibration method 560 addresses signal variability caused by the sensor material aging and use case specific changes on the measured phenomenon and use case environment. In both methods, the dynamic calibration method 560 is accomplished by adjusting signal processing software 128 in the computing unit 122.

Dynamic calibration method 560, can be used, but not limited to, in device 120 with a microcontroller, where it can be run automatically without human feedback and supervision. Alternatively, dynamic calibration method 560 can receive additional human feedback, such as but not limit to, categorical information about too low or high gain setting. This human provided input can be used as a supplementary information in gain optimizer software 126 and or signal processing software 128 when choosing and applying a calibration shift.

Manufacturing-Related Calibration Method

In accordance with one or more embodiments of the present invention, a manufacturing-related calibration method 540 obtains consistent output from the same force or vibration from dynamic force sensors with sensitivity differences connected to electronics. The invention advantageously is a method to accurately, easily, and economically efficiently in a production process of sensors with electronics, to calibrate all produced products comprising one or more sensors comprising or consisting of a dynamic force or vibration sensor, become as homogeneous as possible, without grouping of sensors before connecting to electronics.

FIG. 2 is a schematic diagram of a manufacturing-related calibration method 540 for calibrating one or more dynamic force sensors 121 in accordance with one or more embodiments of the present invention.

In a first step 542 of manufacturing-related calibration method 540, one or more dynamic force sensors 121, each of them, comprising an individual output of different, similar, or same sensitivities 201 is measured using purpose data acquisition software 144*a*.

Therein, sensors electrical output (charge Picocoulombs/Newton, pC/N), based on a standardized force input produced by force inducer 141 (direct mechanical vibration, sound waves in a chamber, or simple standard force touch), is measured against a calibrated reference sensor 142 (calibrated sensor, such as piezo sensor, quasi-piezo, MEMS, or for example dynamic or electret microphone).

In a subsequent step 544, a measured individual sensitivity value (pC/N) is fed to memory 123 by computing device 143 as a calibration value 202, i.e. a calibration shift.

Computing device 143 can receive calibration value 202 via any electrical communication protocol, wired such as UART, SPI or I2C, or wireless, for example Bluetooth, FM or Wi-Fi.

In a subsequent step 546, gain adjuster software 125 applied calibration value 202 in mathematical or algorithmic method (such as, but not limited to: polynomial equation, lookup table, neural network or heuristics) to adjust digital gains, signal multipliers or similar components of a signal processing pipeline 203, to that, the signal is accommodated relative to the signal variability of dynamic force sensor 121.

For example, in case of lookup table as a method of choice, memory 123 of device 120 stores sensor's outputs (sensitivity in pC/N) and corresponding optimal digital gain values. The optimal gain value is selected based on the calibration value 202, so that, a large calibration value could decrease device's digital gain or a small calibration value could increase digital gain. As a result, same force/force change applied to two or more different sensor elements has similar signal levels in each electronic device.

After this software-based calibration, instead of fixed analogue or digital gain, the variability between dynamic force sensors 121 can be compensated in the production much more effectively and save time in the production process. Sensors become much more alike between each other's. Compared to grouped values, the variance in the output on same force, is as close to minimum as possible and problems in the use are minimal.

Dynamic Calibration Method

Figure 3:
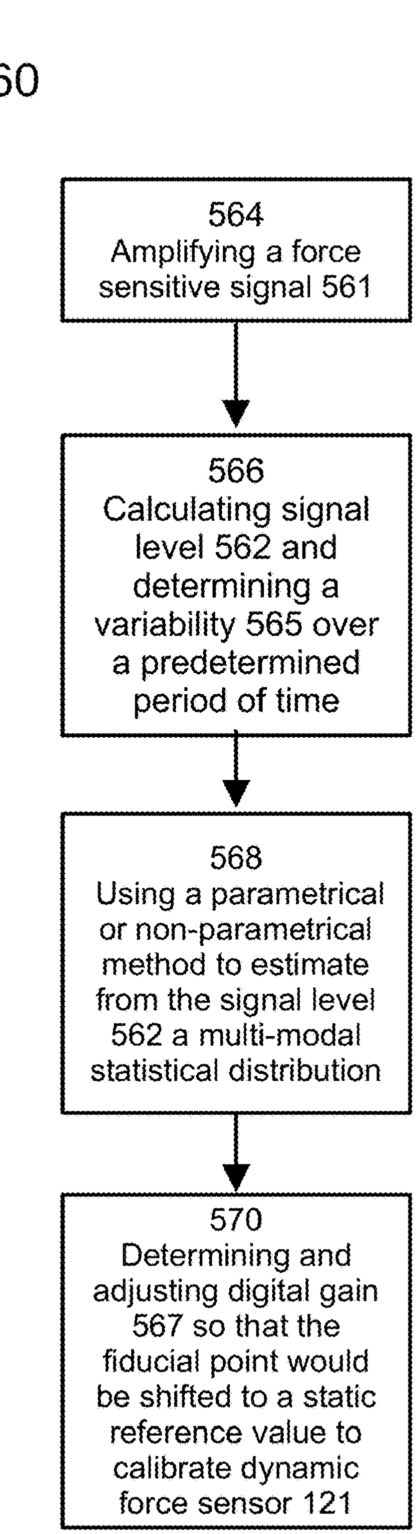
FIG. 3 is a schematic diagram of a dynamic calibration method for calibrating one or more dynamic force sensors in accordance with one or more embodiments of the present invention.

FIG. 3 is a flowchart of a dynamic calibration method 560 for calibrating one or more dynamic force sensors 121 in accordance with one or more embodiments of the present invention.

Figure 4:
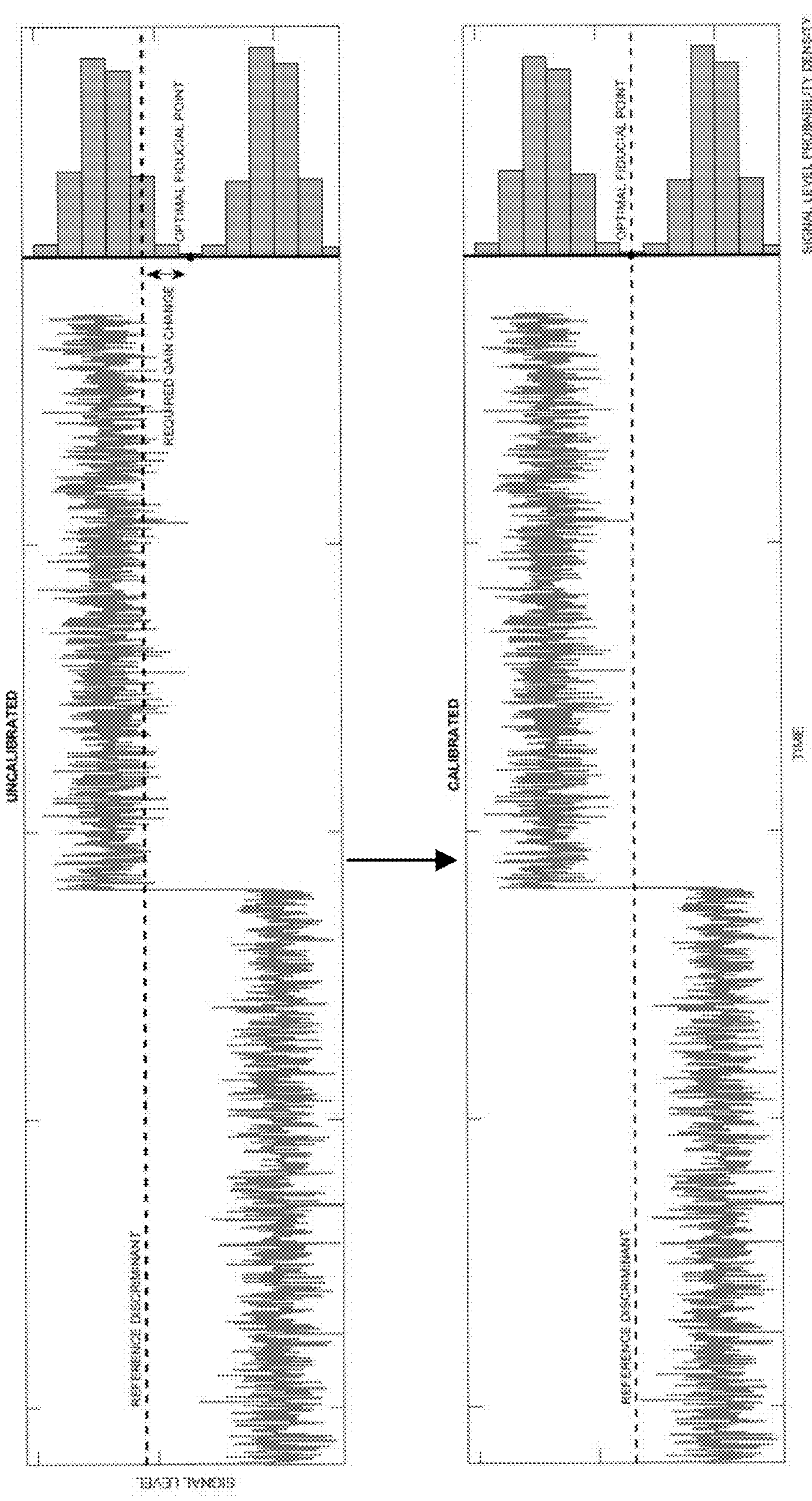
FIG. 4 is a comparison diagram, illustrating an example of the dynamic calibration method in accordance with one or more embodiments of the present invention versus not applying the dynamic calibration method.

FIG. 4 is a comparison diagram, illustrating an example of the dynamic calibration method 560 in accordance with one or more embodiments of the present invention versus not applying the dynamic calibration method 560 to one or more dynamic force sensors 121.

In accordance with one or more embodiments of the presently claimed invention comprises or consists of a dynamic calibration method to automatically or semi-automatically calibrate a computing unit 122 during its active use.

Dynamic calibration method 560 takes advantage of measuring and comparing sensor signal level during the targeted phenomenon, depending on the use case, e.g., patient's occupancy on the sensor, and during absence of this phenomenon, i.e., during background environment noise. The signal level in these two states is compared to a static reference discriminant value to adjust amplifier setting to separate the states; the presence of targeted phenomenon and absence of it.

As shown in FIG. 3, in dynamic calibration method 560, the force sensitive signal 561 is amplified in step 564 and then in step 566 the signal level 562 is calculated. Signal level 562 has a variability 565 to characterize the targeted phenomenon mathematically can be based on, but not limited to, the root-mean-square or power-spectrum estimate of the signal. Variability 565 is recorded over a duration that contains at least one period of presence of targeted phenomenon and one period lacking this phenomenon. The period length is determined by the use case and targeted phenomenon and can vary from seconds to hours.

In a subsequent step 568, using a parametrical or non-parametrical method, multi-modal statistical distribution is estimated from the signal level 562. The final step is the gain level optimizer 146, where an optimal fiducial point is estimated between the modes of the distribution, using local minima or a boundary of machine learning clustering method, such as k-Means algorithm.

Then, in a subsequent step 570, dynamic force sensor 121 is calibrated by determining and adjusting digital gain 567 so that the fiducial point would be shifted to a static reference value. A fiducial point is used as a point of reference or a measurement.

Results of a typical example are illustrated in FIG. 4. In the example is shown the situation when an uncalibrated sensor has insufficient low initial gain. For the first part of the time period illustrated, the phenomenon of interest (such as a bed occupancy of a patient) is absent resulting a low signal level 562. For the second part of the time period we can see a step-wise response and increased signal level when the phenomenon of interest is occurring. However, the signal level 562 remains too low respect to the static reference discriminant level. These two states are typically separable in the signal level space as shown as the two-modal probability density function (histogram here). From the difference between the probability function estimated optimal fiducial point and the reference discriminant level, the required gain change can be estimated. This will be used to dynamically calibrate the device 120. The same principles apply in the alternative situation when the initial gain is too high.

Manufacturing-related calibration addresses variability caused by material factors addressing type (i) variation. This ensures that deployed devices 120 from the same batch have similar signal responses when the phenomenon and environment remain similar. In other words, when the type (ii) and (iii) variability is not extreme. Manufacturing-related calibration is typically sufficient in practice and it ensures that the device works directly out-of-the-box.

Dynamic calibration addresses type (ii) and type (iii) variation. Dynamic calibration will increase the lifespan of devices by addressing the issues caused by the loss of sensor sensitivity due to aging. In practice, a sensor can be deployed in use for several years or even decades. Dynamic calibration makes sensor adaptable to significant and extreme changes in the use case that cannot be addressed prior in the manufacturing line.

Combining two calibration approaches makes the device practical and easy-to-use directly out-of-the-box. This will replace the typical calibration method where a sensor needs to be calibrated using a manual protocol when it is deployed.

It is evident to those skilled in the art that various embodiments of the invention are not limited to the examples outlined above, but rather can be modified within the scope of the claims provided below.

While the invention has been described in conjunction with specific embodiments, it is to be understood that many alternatives, modifications, and variations will be apparent to those skilled in the art in light of the foregoing description.

What is claimed is:

1. A system for calibrating a dynamic force sensor during a life cycle of the dynamic force sensor, the system comprising:

a device for sensing a plurality of data using the dynamic force sensor;

a first calibration system;

the device comprising the dynamic force sensor, a computing unit, and a memory associated with the computing unit;

the first calibration system comprising a reference sensor and a force inducer, the force inducer for applying the same force to both the dynamic force sensor and the reference sensor, the force being the same on the dynamic force sensor and the reference sensor simultaneously, the first calibration system executing data acquisition of the force to determine a difference in a measurement by the dynamic force sensor and a measurement by the reference sensor and applying the difference to adjust the dynamic force sensor's output to match the reference sensor, wherein the first calibration system calibrates the dynamic force sensor during operation of the device without relying on historical usage data or material variability models alone.

2. The system of claim 1, further comprising a dynamic calibration system, the dynamic calibration system being stored in the memory of the computing unit and configured to adjust the dynamic force sensor based on variability over a predetermined period of time in addition to the first calibration system's reference-based adjustment.

3. The system of claim 1, wherein the memory comprises a signal processing software for processing a signal from the dynamic force sensor to compute the difference relative to the reference sensor's signal.

4. The system of claim 3, further comprising a gain optimizer software for determining a gain over a predefined period of time based on the measurement difference from the reference sensor.

5. The system of claim 4, wherein the first calibration system calibrates the dynamic force sensor according to a material variability of the dynamic force sensor in reference to a norm determined from the simultaneous force application of the reference sensor.

6. The system of claim 4, wherein the dynamic calibration system calibrates the dynamic force sensor according to variability over a predetermined period of time in combination with the first calibration system's reference-based difference.

7. The system of claim 1, further comprising a wireless communications device disposed in the device for transmitting calibration data from the computing unit to a remote system.

8. A method of calibrating a dynamic force sensor during a life cycle of the dynamic force sensor using a calibration system, the system comprising:

a device for sensing a plurality of data using the dynamic force sensor;

a first calibration system;

the device comprising the dynamic force sensor, a computing unit, and a memory associated with the computing unit;

the first calibration system comprising a reference sensor and a force inducer, the force inducer for applying the same force to both the dynamic force sensor and the reference sensor, the force being the same on the dynamic force sensor and the reference sensor simultaneously, the first calibration system executing data acquisition of the force to determine a difference in a measurement by the dynamic force sensor and a measurement by the reference sensor and applying the difference to adjust the dynamic force sensor's output to match the reference sensor, wherein the first calibration system calibrates the dynamic force sensor during operation of the device without relying on historical usage data or material variability models alone; the method comprising the steps of:

applying a force to the dynamic force sensor and the reference sensor, the force being the same on the dynamic force sensor and the reference sensor, and measuring the output of the dynamic force sensors using data acquisition software.

9. The method of claim 8, further comprising the step of: applying a calibration calibration-value by gain adjuster software to the dynamic force sensor.

10. The method of claim 8, further comprising a dynamic calibration system, wherein the step comprises the dynamic calibration system being stored in the memory of the computing unit and is configured to adjust based on variability in addition to the reference-based adjustment.

11. The method of claim 10, further comprising using a parametrical or non-parametrical method to estimate from a signal level a multi-modal statistical distribution and tied to reference difference.

12. The method of claim 10, further comprising a step of determining and adjusting digital gain so that the fiducial point would be shifted to a static reference value to calibrate the dynamic force sensor based on the reference sensor's static value from simultaneous force applications.

* * * * *